United States Patent
Accapadi et al.

(10) Patent No.: US 8,037,203 B2
(45) Date of Patent: Oct. 11, 2011

(54) USER DEFINED PREFERRED DNS REFERENCE

(75) Inventors: Jos Manuel Accapadi, Austin, TX (US); Mathew Accapadi, Austin, TX (US); William Lee Britton, Austin, TX (US); Andrew Dunshea, Austin, TX (US); Dirk Michel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2598 days.

(21) Appl. No.: 10/782,668

(22) Filed: Feb. 19, 2004

(65) Prior Publication Data

US 2005/0198386 A1 Sep. 8, 2005

(51) Int. Cl.
*G06F 15/173* (2006.01)

(52) U.S. Cl. ........ 709/238; 709/223; 709/228; 709/230; 707/705; 398/106

(58) Field of Classification Search .................. 709/223, 709/228, 238; 707/705
See application file for complete search history.

(56) References Cited

U.S. PATENT DOCUMENTS

| | | | |
|---|---|---|---|
| 5,408,610 A * | 4/1995 | Arakawa | 709/245 |
| 6,332,158 B1 | 12/2001 | Risley et al. | |
| 6,446,133 B1 * | 9/2002 | Tan et al. | 709/245 |
| 6,480,508 B1 * | 11/2002 | Mwikalo et al. | 370/475 |
| 6,526,450 B1 | 2/2003 | Zhang et al. | |
| 6,785,704 B1 * | 8/2004 | McCanne | 718/105 |
| 6,813,635 B1 * | 11/2004 | Jorgenson | 709/225 |
| 7,194,522 B1 * | 3/2007 | Swildens et al. | 709/217 |
| 7,200,863 B2 * | 4/2007 | Shuster | 726/4 |
| 7,233,978 B2 * | 6/2007 | Overton et al. | 709/217 |
| 2002/0065903 A1 | 5/2002 | Fellman | |

OTHER PUBLICATIONS

Cranor et al. Characterizing large DNS traces using graphs. Proceedings of the 1st ACM SIGCOMM Workshop on Internet Measurement IMW '01. ACM Press, Nov. 2001.*
Dykes et al. An Empirical Evaluation of Client-side Server Seletion Algorithms. IEEE, Infocom. vol. 3, Mar. 2000. pp. 1361-1370.*

* cited by examiner

*Primary Examiner* — Don Wong
*Assistant Examiner* — Tuan-Khanh Phan
(74) *Attorney, Agent, or Firm* — Matthew B. Talpis; James L. Baudino

(57) ABSTRACT

Methods, systems, and products are disclosed for user defined preferred DNS routing that include mapping for a user in a data communications application a domain name of a network host to a network address for a preferred DNS server, wherein the preferred DNS server has a network address for the domain name; receiving from the user a request for access to a resource accessible through the network host; and routing to the preferred DNS server a DNS request for the network address of the network host, the DNS request including the domain name of the network host. In typical embodiments, mapping a domain name to a network address for a preferred DNS server is carried out by storing, through the data communication application, the domain name in association with the network address for a preferred DNS server in a data structure in computer memory.

16 Claims, 4 Drawing Sheets

USER DEFINED PREFERRED DNS REFERENCE

BACKGROUND OF THE INVENTION

1. Field of the Invention

The field of the invention is data processing, or, more specifically, methods, systems, and products for user defined preferred DNS routing.

2. Description of Related Art

The Domain Name System ("DNS") is a name service typically associated with the Internet. The DNS translates domain names in network addresses. The domain names are names of computer hosts providing network service such as web servers, email servers, and others. The network addresses are the network addresses of the network host computers. In the example of the Internet, the network addresses are often internet protocol ("IP") addresses. Domain names are expressed in alphabetic text, easier for humans to work with than numeric network addresses. Networks, however, operate on numeric network addresses. Every time a user requests a resource by use of a domain name, therefore, a DNS service somewhere translates the domain name into a corresponding network address. The domain name "ibm.com," for example, might translate into the IP network address 129.42.19.99. The DNS is actually a network in its own right, a network of DNS servers. If one DNS server is unable to translate a particular domain name, that server can obtain additional information from other DNS servers in the network.

The goal of domain names is to provide a mechanism for naming resources in such a way that the names are usable in different hosts, networks, protocol families, internets, and administrative organizations. From the user's point of view, domain names are useful as arguments to a function, called a resolver, which retrieves information associated with the domain name. Thus a user might ask for the host address or mail information associated with a particular domain name. To enable the user to request a particular type of information, an appropriate query type is passed to the resolver with the domain name. To the user, the domain tree is a single information space; the resolver is responsible for hiding the distribution of data among name servers from the user.

Resolvers are programs that extract information from name servers in response to client requests. Resolvers must be able to access at least one name server and use that name server's information to answer a query directly, or pursue the query using referrals to other name servers. A resolver will typically be a system routine that is directly accessible to user programs, so that no protocol usually is needed between the resolver and the user program. Both the name server and resolver are software processes executing on one or more computers. Essentially, the resolver submits a query to a name server about a domain name. The name server "resolves" the mapping of the domain name to a machine address and sends the machine address back to the resolver as the "answer" to the query.

In many network hosts, a resolver is part of the operating system. More particularly, in the case of TCP/IP, the resolver is often part of the TCP/IP client accessible from the application level through a C or C++ call through an Application Programming Interface ("API") such as the sockets API. The Microsoft Windows™ Sockets API, for example, provides functions named gethostbyname( ) and WSAAsyncGetHostByName( ) that respectively work synchronously and asynchronously to obtain network addresses for network hosts given the hosts' domain names as inputs. Similarly, the Java method InetAddress.getByName(string host) is a static Java method that instantiates an object of class InetAddress representing the internet protocol address of a network host.

DNS includes a request/response data communications protocol with standard message types. Gethostbyname( ) and InetAddress.getByName( ) are examples of API calls to a TCP/IP client in an operating system such as Unix or Windows. Such a TCP/IP client typically bears one or more predesignated DNS server addresses, designations of a primary DNS server for a computer and possibly one or more secondary DNS servers. In response to a call to a resolver function such as gethostbyname( ) and InetAddress.getByName( ), a TCP/IP client sends a DNS request message containing the domain name in a standard format to a predesignated primary DNS server requesting a corresponding network address, and, upon receiving a response message, provides the network address in return to the calling program.

When a calling application receives the network address from the operating system, it can use the network address to access resources on the network host identified by the domain name associated with the network address. The network host can be any computer connected to the network. In the example where the calling application is a web browser executing on a user's computer, after the user types in a domain name and the browser (via the resolver process) receives the network address for the domain name, the next action is to transfer a request to the network host's address for a specific web page to be displayed on the user's web browser.

It is useful to distinguish domain names and URLs. URLs identify resources available through network hosts having domain names that form a portion of the URL. In the browser example, when a user requests access to a resource by entering a URL or selecting a URL by mouse-clicking a hyperlink, the browser extracts from the URL the domain name of the host on which the resource is located and submits the domain name to a resolver. The browser then uses the returned network address to establish a data communications connection to the host containing the resource and uses the entire URL to request the resource from the host.

As discussed above, conventional TCP/IP clients typically bear one or more predesignated DNS server addresses, designations of a primary DNS server for a computer and possibly one or more secondary DNS servers. These conventional TCP/IP clients have a number of drawbacks. Often the DNS server addresses must be predesignated by a system administrator or user having administrator privileges and therefore many users do not have sufficient privileges to predesignate DNS server addresses. Furthermore, such conventional TCP/IP clients often have the same predesignated DNS server addresses and therefore, all domain names are resolved through the same predesignated DNS server addresses. If a predesignated DNS server address is unavailable, a particular domain name may not be resolved. Even further, these conventional TCP/IP clients do not provide a mechanism to designate different DNS server address for different domain names. If a predesignated DNS server has no immediate capability of resolving a domain name, that server is faced with a laborious procedure of, for example, querying a top level DNS server to try to locate another DNS server that is in fact capable of resolving the domain name. There is ongoing need for improvement in users' ability to designate preferred DNS servers for particular domains.

SUMMARY OF THE INVENTION

Methods, systems, and products are disclosed for user defined preferred DNS routing that include mapping for a user in a data communications application a domain name of a network host to a network address for a preferred DNS server, wherein the preferred DNS server has a network address for the domain name; receiving from the user a request for access to a resource accessible through the network host; and routing to the preferred DNS server a DNS request for the network address of the network host, the DNS request including the domain name of the network host. In typical embodiments, mapping a domain name to a network address for a preferred DNS server is carried out by storing, through the data communication application, the domain name in association with the network address for a preferred DNS server in a data structure in computer memory. In such embodiments, mapping a domain name to a network address for a preferred DNS server also includes receiving from a user a domain name for a network host having a domain name registered on a preferred DNS server and receiving from the user a network address for the preferred DNS server.

In many embodiments, routing a DNS request for the network address of the network host is carried out by the data communications application. In some embodiments, routing a DNS request for the network address of the network host is carried out by an operating system. In some embodiments, routing a DNS request for the network address of the network host is carried out by a predesignated DNS server. Typical embodiments also include receiving from the preferred DNS server a DNS response identifying the network address of the network host and accessing the resource through the network address of the network host.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for user defined preferred DNS routing. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

User Defined Preferred DNS Routing

Figure 1:
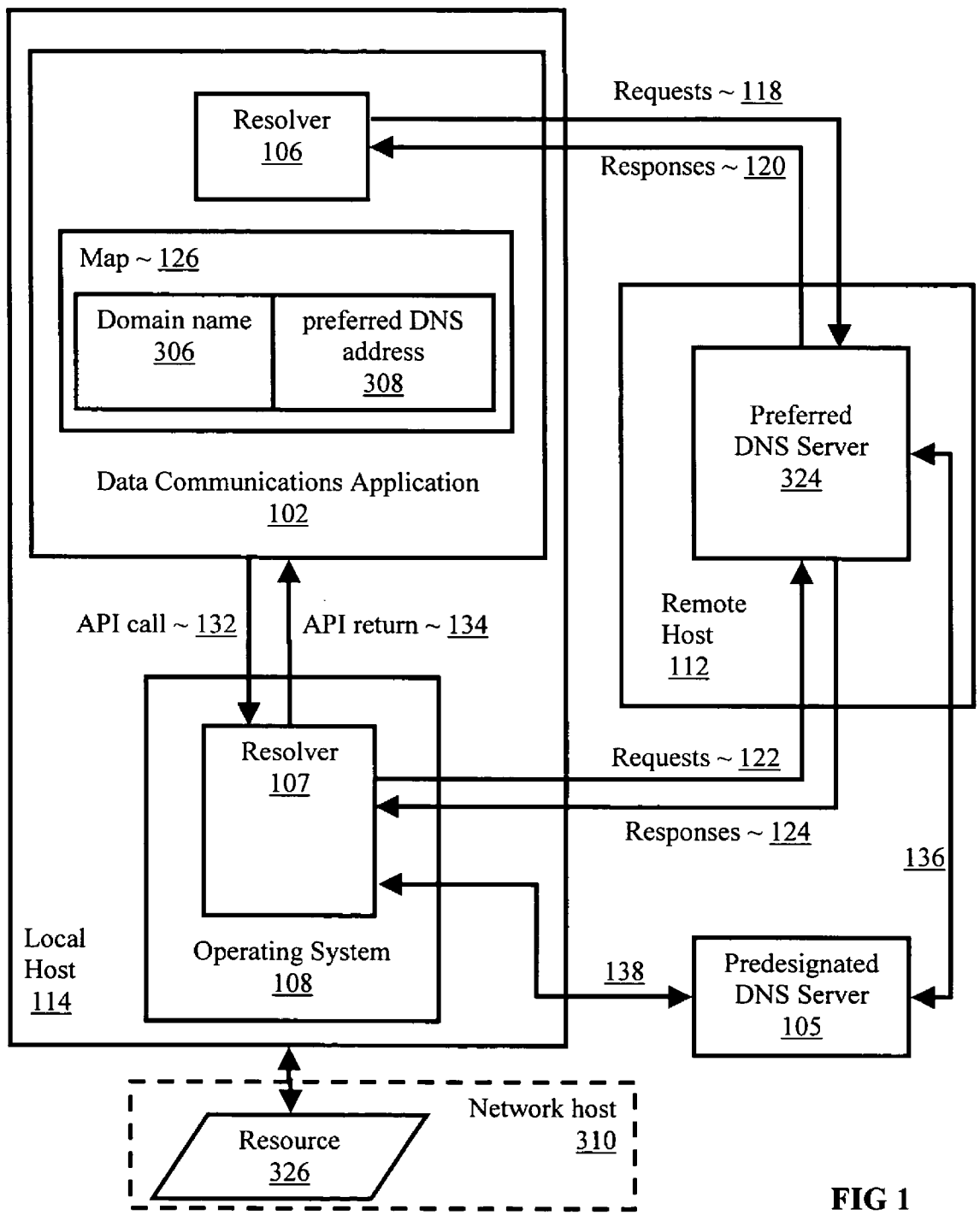
FIG. 1 sets forth a line drawing of an exemplary system architecture in which various embodiments of the present invention may be implemented.

Exemplary methods, systems, and products for user defined preferred DNS routing are described with reference to the drawings, beginning with FIG. 1. FIG. 1 sets forth a line drawing of an exemplary system architecture in which various embodiments of the present invention may be implemented. The architecture of FIG. 1 includes a data communications application (102) running on a local host (114). A data communication application (102) may be a browser, a microbrowser, an email client, an instant messaging client, a group conferencing client, or any other data communications application as will occur to those of skill in the art. The local host may be any automated computer machinery capable of networked data communications including handheld wireless devices, network-enabled personal digital assistants, cellular telephones, laptop computers, desktop computers, personal computers, or any other network-enabled computing machinery as will occur to those of skill in the art.

The data communications application accesses computer resources (326) through network hosts (310) each of which is identified by a domain name and located at a network location identified by a network address. Examples of network hosts include instant messaging servers, web servers, email servers, and any other servers managing resources on a network as will occur to those of skill in the art.

The local host includes an operating system (107) that in turn includes a resolver (107). The resolver is capable of DNS communications through DNS request messages (122) and DNS response messages (124) to and from a preferred DNS server (324) as well as a predesignated DNS server (105). The predesignated DNS server (105) is represented as the standard DNS server whose network address is predesignated as an operating parameter for a TCP/IP client in the operating system (108), for example. The preferred DNS server (324) operates at a network address (306) mapped (126) in the data communication application (102) to a domain name (306) of a network host (310) having a resource (326) accessible to the local host.

The preferred DNS server (324) stores network addresses for domain names of network hosts (310).

The architecture of FIG. 1 illustrates three ways of communicating DNS requests to the preferred DNS server (324), although the number three is not a limitation of the invention, and as many way of communicating DNS requests to a preferred DNS server as will occur to those of skill in the art are well within the scope of the present invention. In the architecture of FIG. 1, a resolver (107) in an operating system on the local host may communicate DNS request to the preferred DNS server. In an example in which the resolver is called through an API call such as "gethostbyname( )," the gethostbyname( ) function is overloaded or rewritten to accept both a domain name and a preferred DNS address as parameters.

In the architecture of FIG. 1, in a second way of communicating DNS requests to a preferred DNS server, a resolver (106) in a data communications application (102) may communicate DNS requests to the preferred DNS server. In such an example, the resolver (106) in the data communications application (102) may be programmed to retrieve the preferred DNS address (308) from map (126) for a particular domain name (306), open a data communication connection to the preferred DNS server (324), request (118) the network address associated with the domain name, and, if the request fails, issue a call to the resolver (107) in the operating system (108) for resolution of the domain name through a predesignated DNS server (105). This exemplary architecture may effect very efficient operations. That is, the call to the resolver may be a local subroutine call within the data communications application itself, and, when the preferred DNS server is capable of resolving the domain name, this exemplary architecture resolves the domain name with only one DNS request/response exchange.

In the architecture of FIG. 1, in a third way of communicating DNS requests to a preferred DNS server, a resolver (107) in the operating system may be programmed to accept a preferred DNS address as a call parameter through its API and pass the preferred DNS address along with the domain name in a DNS request message (138) to its predesignated DNS server (105). In this example, when the domain name is not already in its local cache, predesignated DNS server (105) is programmed to extract a preferred DNS address from a DNS request message and use that address for DNS communications to resolve the domain name. In this way, predesignated DNS server (105) avoids the need for additional DNS messaging to and from a root name server to obtain a network address for a DNS server capable of resolving the domain name.

Figure 2:
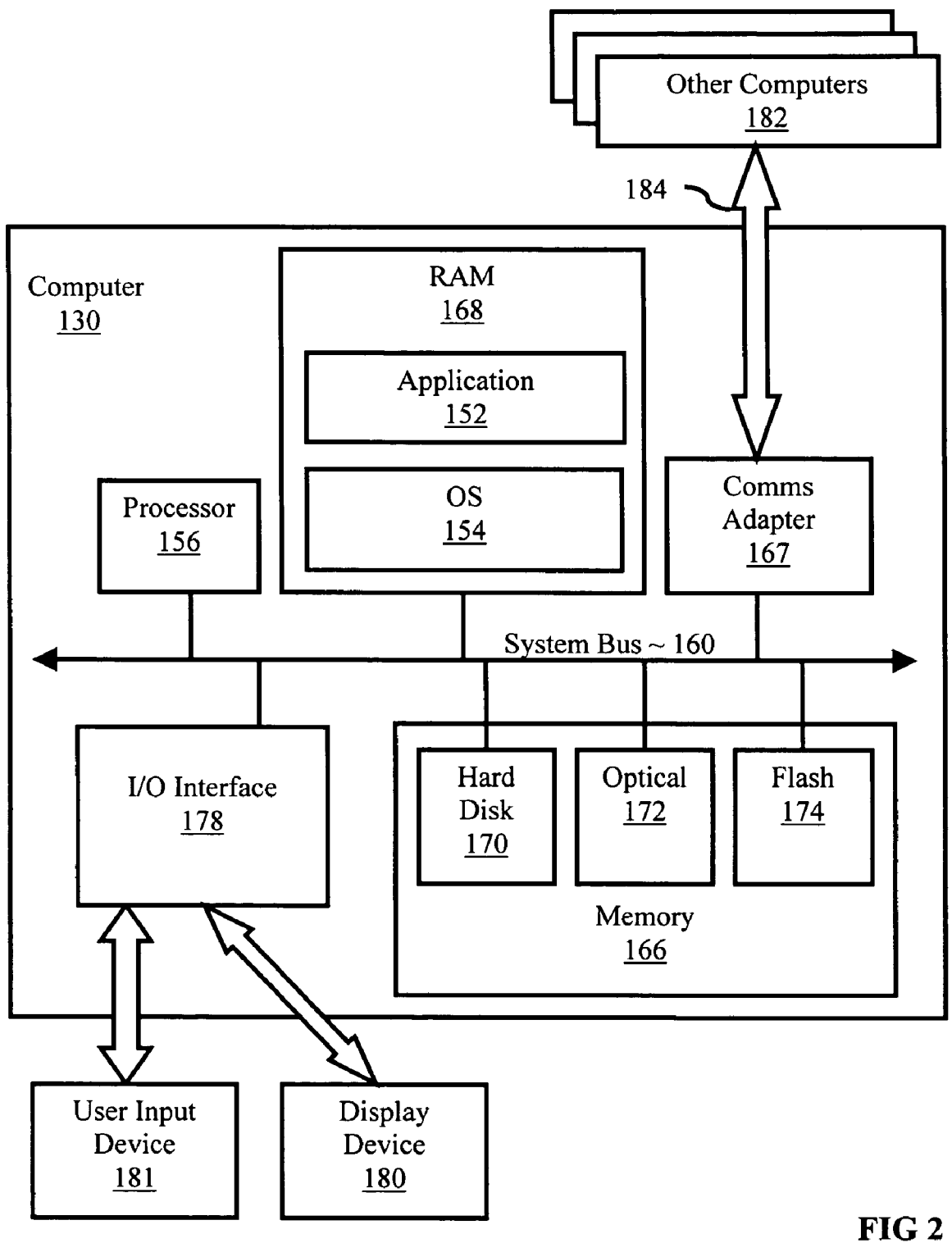
FIG. 2 sets forth a block diagram of automated computing machinery comprising a computer useful in systems for user defined preferred DNS routing according to embodiments of the present invention.

FIG. 2 sets forth a block diagram of automated computing machinery comprising a computer 106, such as a local host, remote host, or server, useful in systems for user defined preferred DNS routing according to embodiments of the present invention. The computer 106 of FIG. 2 includes at least one computer processor 156 or 'CPU' as well as random access memory 168 ("RAM"). Stored in RAM 168 is an application program 152. Application programs useful in implementing inventive methods of the present invention include data communications programs such as browsers, microbrowsers, or email clients running on local hosts. More particularly, in data communications applications according to embodiments of the present invention, RAM includes computer program instructions for mapping domain names of network hosts to network addresses for preferred DNS servers, receiving from a user a request for access to a resource accessible through a network host, and routing to a preferred DNS server a DNS request for the network address of such a network host.

Also stored in RAM 168 is an operating system 154. Operating systems useful in computers according to embodiments of the present invention include Unix, Linux, Microsoft NT™, and many others as will occur to those of skill in the art.

The computer 106 of FIG. 2 includes computer memory 166 coupled through a system bus 160 to the processor 156 and to other components of the computer. Computer memory 166 may be implemented as a hard disk drive 170, optical disk drive 172, electrically erasable programmable read-only memory space (so-called 'EEPROM' or 'Flash' memory) 174, RAM drives (not shown), or as any other kind of computer memory as will occur to those of skill in the art.

The example computer 106 of FIG. 2 includes communications adapter 167 implementing couplings for data communications 184 to other computers 182, servers or clients. Communications adapters implement the hardware level of connections for data communications through which local hosts and remote hosts or servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 2 includes one or more input/output interface adapters 178. Input/output interface adapters in computers implement user-oriented input/output through, for example, software drivers and computer hardware for controlling output to display devices 180 such as computer display screens, as well as user input from user input devices 181 such as keyboards and mice.

Figure 3:
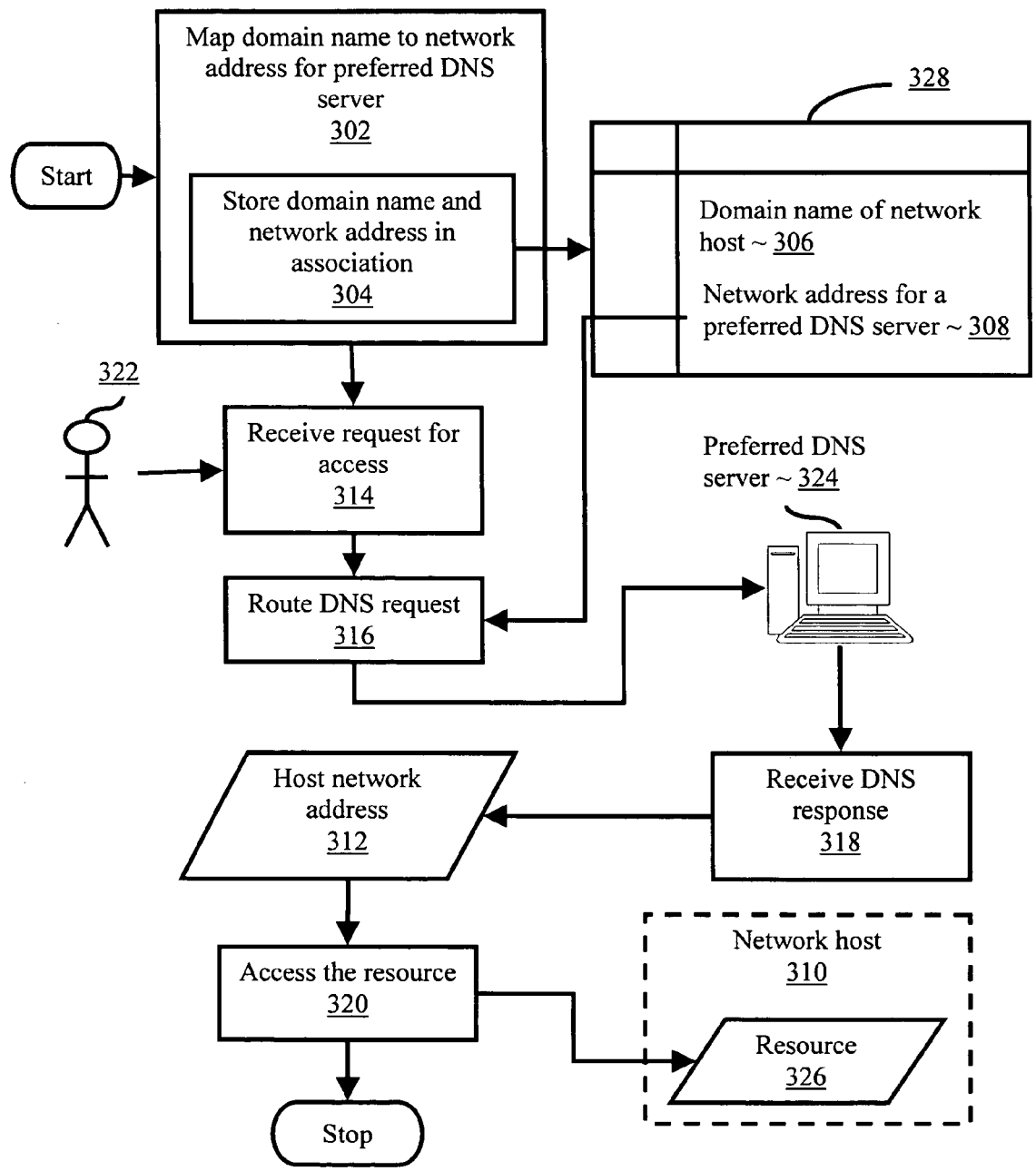
FIG. 3 sets forth a flow chart illustrating an exemplary method of user defined preferred DNS routing.

FIG. 3 sets forth a flow chart illustrating an exemplary method of user defined preferred DNS routing that includes mapping (302) for a user (322) in a data communications application a domain name (306) of a network host (310) to a network address (308) for a preferred DNS server (324). In the example of FIG. 3, the preferred DNS server (324) has a network address for the domain name. That is, the preferred DNS server (324) in this example is a DNS server capable of resolving the domain name directly.

In the method of FIG. 3, mapping (302) a domain name (306) to a network address (308) for a preferred DNS server (324) typically includes receiving from a user a domain name for a network host having a domain name registered on a preferred DNS server and receiving from the user a network address for the preferred DNS server. In the method of FIG. 3, mapping (302) a domain name (306) to a network address (308) for a preferred DNS server includes storing (304), through the data communication application, the domain name (306) in association with the network address (308) for a preferred DNS server (324) in a data structure (328) in computer memory. More particularly, a mapping for a user of a domain name of a network host to a network address for a preferred DNS server may be implemented, for example, by use of data structure such as that shown in Table 1:

TABLE 1

Preferred DNS Entries

| UserID | Domain Name | Preferred DNS Server Network Address |
|---|---|---|
| marilyn | ibm.com | 129.34.20.80 |
| marilyn | ebay.com | 66.135.207.138 |
| marilyn | amazon.com | 112.21.63.89 |
| john | cnn.com | 149.174.213.151 |
| john | ibm.com | 192.35.232.34 |
| john | yahoo.com | 123.56.87.114 |

Each record in Table 1 represents a mapping for a user of a domain name of a network host to a network address for a preferred DNS server. In this example, a user identified by user identification "marilyn" has mapped the domain name "ibm.com" to a preferred DNS server's network address of 129.34.20.80. Marilyn has also mapped the domain name "ebay.com" to a preferred DNS server's network address of 66.135.207.138 and the domain name "amazon.com" to a preferred DNS server's network address of 112.21.63.89. In this example, a user identified by user identification "john" has mapped the domain name "cnn.com" to a preferred DNS server's network address of 149.174.213.151. John has also mapped the domain name "ibm.com" to a preferred DNS server's network address of 192.35.232.34 and the domain name "yahoo.com" to a preferred DNS server's network address of 123.56.87.114. This example illustrates six preferred DNS entries, but the number six is not a limitation of the invention. In fact, various embodiments of the present invention use any number of DNS entries as will be found useful by user or as will occur to those of skill in the art.

Figure 4:
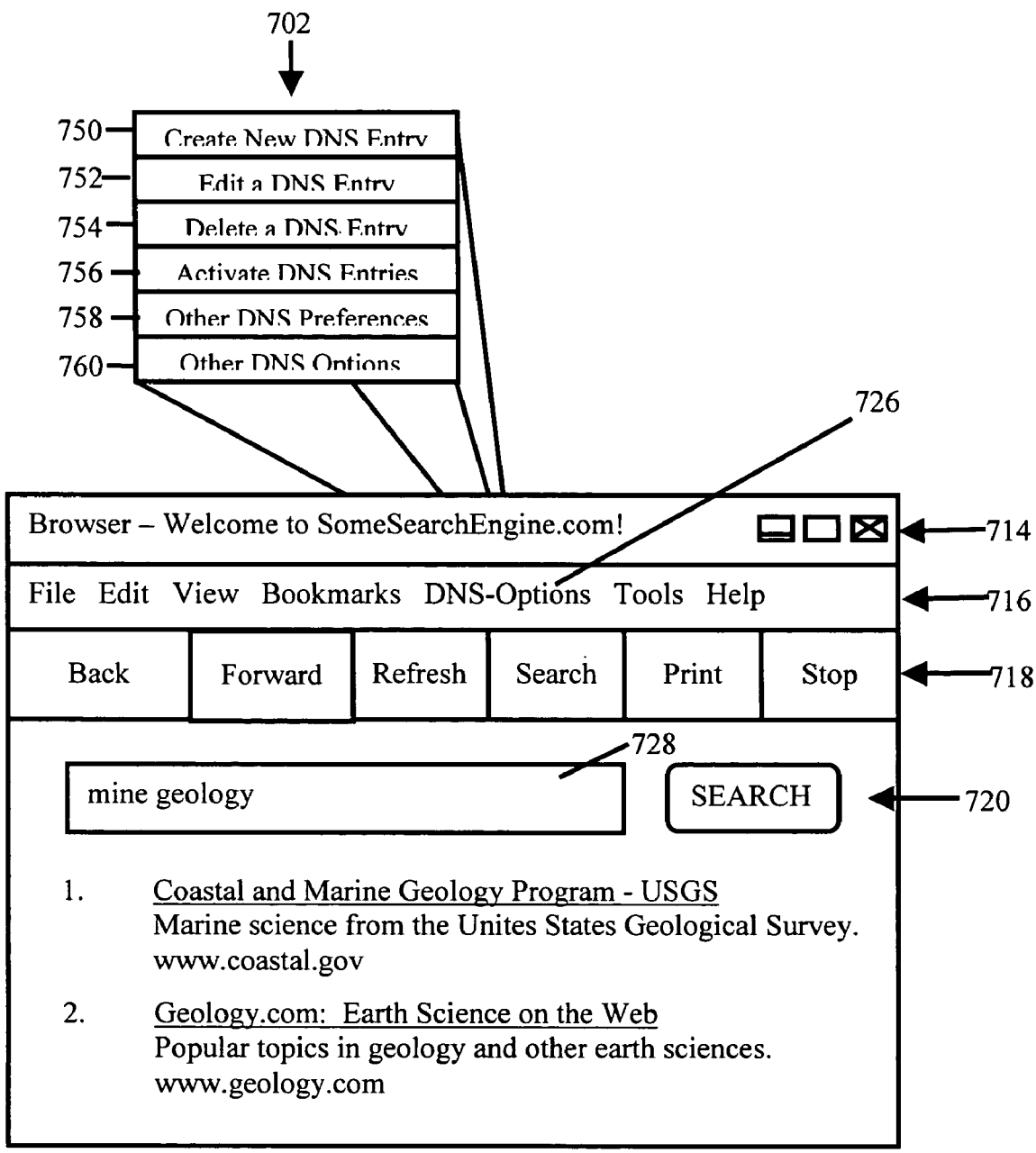
FIG. 4 depicts a graphical user interface on a local host running an exemplary data communication application.

FIG. 4 depicts a graphical user interface on a local host running an exemplary data communication application, more particularly, in the example of FIG. 4, a browser. The browser of FIG. 4 is an example of a data communications application in a local host that is capable of receiving from a user a domain name for a network host having a domain name registered on a preferred DNS server and a network address for the preferred DNS server. The example browser of FIG. 4 is one that has been programmed at the source code level, or modified with a plug-in, to receive from a user a domain name for a network host having a domain name registered on a preferred DNS server and a network address for the preferred DNS server. The browser of FIG. 4, as depicted, has been operated to point to a web site named "SomeSearchEngine.com," as shown in the title bar of the browser display 714. The browser of FIG. 4 includes a GUI toolbar 718 with a Back button, a Forward button, and buttons for refreshing the display, searching, printing, and stopping web page retrievals. The browser of FIG. 4 also includes a horizontal menu 716 containing the menu items File, Edit, View, Bookmark (called 'Favorites' on some browsers), DNS-Options, Tools, and Help.

The menu entry called DNS-Options 726 is programmed to display a menu 702 of DNS options operable in support of user defined preferred DNS routing according to embodiments of the present invention. The DNS options operable through menu 702 include creating a new preferred DNS entry 750, editing an existing preferred DNS entry 752, deleting an existing preferred DNS entry 754, activation of the use of preferred DNS entries 756, other DNS preferences 758, and other miscellaneous preferred DNS options 760. Selecting the menu entry for creating a new preferred DNS entry 750 enables a user to input through a data entry form and store in computer memory with the browser's other operating options and parameters a domain name for a network host having a domain name registered on a preferred DNS server and a network address for that preferred DNS server. Some embodiments provide a parameterized option to default into such a data entry form the domain name from the URL at which a browser is currently pointing and a network address for the DNS server where that domain name was resolved—thus providing a convenient way to make available for later use or editing a network address for a preferred DNS server where that domain name may be resolved.

Similarly, selecting the menu entry for editing a DNS entry 752 enables a user to edit through a data entry form and save back into computer memory with the browser's other operating options and parameters an existing domain name for a network host having a domain name registered on a preferred DNS server and an existing network address for that preferred DNS server. Selecting the menu entry for deleting a DNS entry 754 enables a user to delete through a data entry form from computer memory an existing domain name for a network host having a domain name registered on a preferred DNS server and an existing network address for that preferred DNS server. Selecting the menu entry for activating DNS entries 756 toggles a Boolean indication among the browser's operating parameters whether preferred DNS entries are to be used by the browser. When the Boolean indication is set to True, the browser pop-up menu display at reference 756 is changed to read "Inactivate DNS Entries."

The method of FIG. 3 also includes receiving (314) from the user (322) a request for access to a resource (326) accessible through the network host (310). In the browser example, receiving a request for access to a resource is implemented by a user's entering a URL or selecting a URL by mouse-clicking a hyperlink. When a user requests access to a resource by entering a URL or selecting a URL by mouse-clicking a hyperlink, the browser extracts from the URL the domain name of the host on which the resource is located and submits the domain name to a resolver.

The method of FIG. 3 also includes routing (316) to the preferred DNS server (324) a DNS request for the network address of the network host (310), the DNS request including the domain name of the network host. In the method of FIG. 3, routing (316) a DNS request to the preferred DNS server for the network address of the network host (310) may be carried out by the data communications application. Alternatively, routing (316) a DNS request to the preferred DNS server for the network address of the network host may be carried out by an operating system. Alternatively, routing (316) a DNS request to the preferred DNS server for the network address of the network host may be carried out by a predesignated DNS server. Routing of a DNS request to a preferred DNS server may also be carried out in other ways as will occur to those of skill in the art.

The method of FIG. 3 also includes receiving (318) from the preferred DNS server (324) a DNS response identifying the network address (312) of the network host (310) and accessing (320) the resource (326) through the network address (312) of the network host (310). In the example of a browser, the browser then uses the returned network address to establish a data communications connection to the host containing the resource and uses the entire URL to request the resource from the host.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of user defined preferred DNS routing, the method comprising:
   mapping for a user in a data communications application a domain name of a network host to a DNS network address for a preferred DNS server, wherein the preferred DNS server has a host network address for the domain name, and wherein mapping the domain name to the DNS network address for the preferred DNS server further comprises receiving from a user the domain name for the network host having the domain name registered on the preferred DNS server and receiving from the user the DNS network address for the preferred DNS server;
   receiving from the user a request for access to a resource accessible through the network host; and
   routing to the preferred DNS server a DNS request for the host network address of the network host, the DNS request including the domain name of the network host.

2. The method of claim 1 wherein mapping a domain name to a DNS network address for a preferred DNS server further comprises associating, through the data communication application, an identifier for the user with the domain name and with the DNS network address for a preferred DNS server in a table in computer memory, the table capable of supporting many-to-many relationships between user identifiers, domain names, and DNS network addresses for preferred DNS servers.

3. The method of claim 1 wherein routing a DNS request for the host network address of the network host is carried out by the data communications application.

4. The method of claim 1 wherein routing a DNS request for the host network address of the network host is carried out by an operating system.

5. The method of claim 1 wherein routing a DNS request for the host network address of the network host is carried out by a predesignated DNS server, wherein a predesignated DNS server is a standard DNS server having a network address that is predesignated as a default operating parameter for the data communications application.

6. The method of claim 1 further comprising:
receiving from the preferred DNS server a DNS response identifying the host network address of the network host; and
accessing the resource through the host network address of the network host.

7. A system for user defined preferred DNS routing, the system comprising:
means for mapping for a user in a data communications application a domain name of a network host to a DNS network address for a preferred DNS server, wherein the preferred DNS server has a host network address for the domain name, and wherein means for mapping the domain name to the DNS network address for the preferred DNS server further comprises means for receiving from a user the domain name for the network host having the domain name registered on the preferred DNS server and means for receiving from the user the DNS network address for the preferred DNS server;
means for receiving from the user a request for access to a resource accessible through the network host; and
means for routing to the preferred DNS server a DNS request for the host network address of the network host, the DNS request including the domain name of the network host.

8. The system of claim 7 wherein means for mapping a domain name to a DNS network address for a preferred DNS server further comprises means for associating, through the data communication application, an identifier for the user with the domain name and with the DNS network address for a preferred DNS server in a table in computer memory, the table capable of supporting many-to-many relationships between user identifiers, domain names, and DNS network addresses for preferred DNS servers.

9. The system of claim 7 wherein means for routing a DNS request for the host network address of the network host further comprises the data communications application.

10. The system of claim 7 wherein means for routing a DNS request for the host network address of the network host further comprises an operating system.

11. The system of claim 7 wherein means for routing a DNS request for the host network address of the network host further comprises a predesignated DNS server, wherein a predesignated DNS server is a standard DNS server having a network address that is predesignated as a default operating parameter for the data communications application.

12. The system of claim 7 further comprising:
means for receiving from the preferred DNS server a DNS response identifying the host network address of the network host; and
means for accessing the resource through the host network address of the network host.

13. A computer program product for user defined preferred DNS routing, the computer program product comprising:
recording medium;
means, recorded on the recording medium, for mapping for a user in a data communications application a domain name of a network host to a DNS network address for a preferred DNS server, wherein the preferred DNS server has a host network address for the domain name, and wherein means, recorded on the recording medium, for mapping the domain name to the DNS network address for the preferred DNS server further comprises means, recorded on the recording medium, for receiving from a user the domain name for the network host having the domain name registered on the preferred DNS server and means, recorded on the recording medium, for receiving from the user the DNS network address for the preferred DNS server;
means, recorded on the recording medium, for receiving from the user a request for access to a resource accessible through the network host; and
means, recorded on the recording medium, for routing to the preferred DNS server a DNS request for the host network address of the network host, the DNS request including the domain name of the network host.

14. The computer program product of claim 13 wherein means, recorded on the recording medium, mapping a domain name to a DNS network address for a preferred DNS server further comprises means, recorded on the recording medium, for associating, through the data communication application, an identifier for the user with the domain name and with the DNS network address for a preferred DNS server in a table in computer memory, the table capable of supporting many-to-many relationships between user identifiers, domain names, and DNS network addresses for preferred DNS servers.

15. The computer program product of claim 13 wherein means, recorded on the recording medium, for routing a DNS request for the host network address of the network host further comprises the data communications application.

16. The computer program product of claim 13 further comprising:
means, recorded on the recording medium, for receiving from the preferred DNS server a DNS response identifying the host network address of the network host; and
means, recorded on the recording medium, for accessing the resource through the host network address of the network host.

* * * * *